United States Patent
Sandberg et al.

(10) Patent No.: US 8,124,364 B2
(45) Date of Patent: Feb. 28, 2012

(54) BIOTIN DERIVATIVES

(75) Inventors: Bengt Sandberg, Blomstergården (SE);
Scott Wilbur, Edmonds, WA (US);
Rune Nilsson, Utsättaregränden (SE)

(73) Assignee: Glycorex Transplantation AB, Lund (SE)

( * ) Notice: Subject to any disclaimer, the term of this patent is extended or adjusted under 35 U.S.C. 154(b) by 600 days.

(21) Appl. No.: 10/311,150

(22) PCT Filed: Jun. 18, 2001

(86) PCT No.: PCT/SE01/01374
§ 371 (c)(1),
(2), (4) Date: Apr. 23, 2003

(87) PCT Pub. No.: WO01/95857
PCT Pub. Date: Dec. 20, 2001

(65) Prior Publication Data
US 2004/0052784 A1    Mar. 18, 2004

Related U.S. Application Data

(60) Provisional application No. 60/216,625, filed on Jul. 7, 2000.

(30) Foreign Application Priority Data

Jun. 16, 2000  (SE) .................... 0002287

(51) Int. Cl.
G01N 33/53    (2006.01)
G01N 33/532   (2006.01)
C12M 1/34     (2006.01)
C07K 16/00    (2006.01)

(52) U.S. Cl. ............ 435/7.5; 435/7.92; 435/287.2; 436/544; 530/391.9; 530/413; 424/178.1

(58) Field of Classification Search ............ 435/7.1, 435/7.5, 7.92; 436/518, 532, 824; 530/403, 530/412
See application file for complete search history.

(56) References Cited

U.S. PATENT DOCUMENTS

| | | | |
|---|---|---|---|
| 5,482,698 A | 1/1996 | Griffiths | 424/141 |
| 5,491,097 A | 2/1996 | Ribi et al. | |
| 6,153,442 A * | 11/2000 | Pirio et al. | 436/533 |
| 6,251,394 B1 | 6/2001 | Nilsson et al. | 424/140.1 |

(Continued)

FOREIGN PATENT DOCUMENTS

WO    WO 9212730    8/1992

(Continued)

OTHER PUBLICATIONS

Barocci et al. In vitro removal of anti-HLA IgG antibodies from highly sensitized transplant recipients by immunoadsorption with protein A and protein G sepharose columns: a comparison. Transpl Int 1993, vol. 6, pp. 29-33.*

(Continued)

*Primary Examiner* — Shafiqul Haq
(74) *Attorney, Agent, or Firm* — Smith, Gambrell & Russell, LLP

(57) ABSTRACT

A method for the conditioning of an extracorporeal device is described, as well as method for extracorporeal extraction of toxic material from mammalian body fluids in connection with diagnosis or treatment of a mammalian condition or disease, in which methods reagents having the ability to extract toxic material from mammalian body fluids are involved, and an extracorporeal device comprising said reagent.

12 Claims, 3 Drawing Sheets

Conditioning of (Strept)Avidin Matrix with Derivatized Dibiotin Compounds

U.S. PATENT DOCUMENTS

| | | | |
|---|---|---|---|
| 6,413,934 | B1 | 7/2002 | Stayton et al. |
| 7,141,676 | B1 | 11/2006 | Wilbur |
| 2001/0023288 | A1* | 9/2001 | Wilbur et al. ............. 530/391.1 |
| 2002/0159994 | A1 | 10/2002 | Sandberg |
| 2005/0271673 | A1 | 12/2005 | Wilbur |

FOREIGN PATENT DOCUMENTS

| | | |
|---|---|---|
| WO | WO 9729114 | 8/1997 |
| WO | WO 00/02050 | 1/2000 |
| WO | WO 00/02051 | 1/2000 |
| WO | WO 00/72802 | 12/2000 |

OTHER PUBLICATIONS

Osterwalder et al. Immunoadsorption for removal of anti-A and anti-B blood group antibodies in ABO-incompatible bone marrow transplantation. Annals of Hematoloty 1986, vol. 53, No. 5, pp. 379-390.*

Biochemistry, vol. 268, 1999, Hyun-Ock Kim et al., "Reusability of Avidin-Biotinylated Immunoglobulin Y Columns in Immunoaffinity Chromatography", pp. 383-397.

Meth. Enzymol. vol. 184, 1990, Finn F.M. et al., "Isolation and characterization of hormone receptors", p. 244-250, see p. 245, fig. 1.

CA on CD, Accession No. 131:41599, 1999, Wilchek, Meir et al., "Avidin-biotin immobilization systems"; * Immobilized Biomol. Anal., 15-34, Ed. Cass, Tonyet et al., 1998.

Cancer, vol. 80, No. 12, Suppl., Dec. 15, 1997, Jan Tennvall et al., "Improving Tumor-to-Normal-Tissue Ratios of Antibodies by Extracorporeal Immunoadsorption Based on the Avidin-Biotin Concept", p. 2411-p. 2418, see p. 2417.

Bioconjugate Chem. vol. 8, 1997, D. Scott Wilbur et al., "Biotin Reragents for Antibody Pretargeting.2.Synthesis and in Vitro Evaluation of Biotin Dimers and Trimers for Cross-Linking of Streptavidin", p. 819-p. 832, see p. 820, left col. and pp. 824-825.

U.S. Appl. No. 09/519,998, filed Mar. 6, 2000, Wilbur.

U.S. Appl. No. 11/516,419, filed Sep. 6, 2006, Wilbur.

Chen et al. (1997), "Extracorporeal immunoadsorption compared to avidin chase: enhancement of tumor-to-normal tissue ratio for biotinylated rhenium-188-chimeric BR96.", J. Nucl. Med. 38(12):1934-1939.

Norrgren et al. (1993) "A general, extracorporeal immunoadsorption method to increase the tumor-to-normal tissue ratio in radioimmunoimaging and radioimmunotherapy." J. Nucl. Med. 34(3):448-454.

* cited by examiner

Figure 1: Conditioning of (Strept)Avidin Matrix with Derivatized Dibiotin Compounds
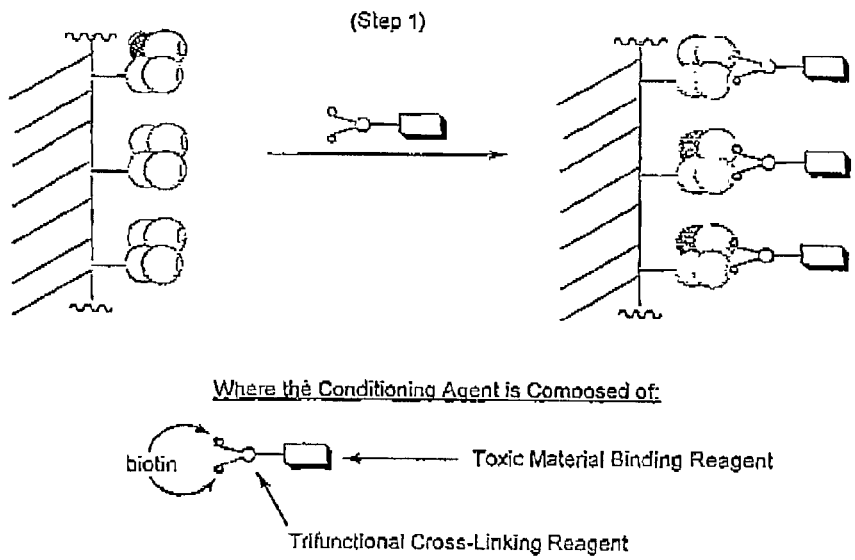
Figure 2: Binding of Toxic Material with Conditioned Column
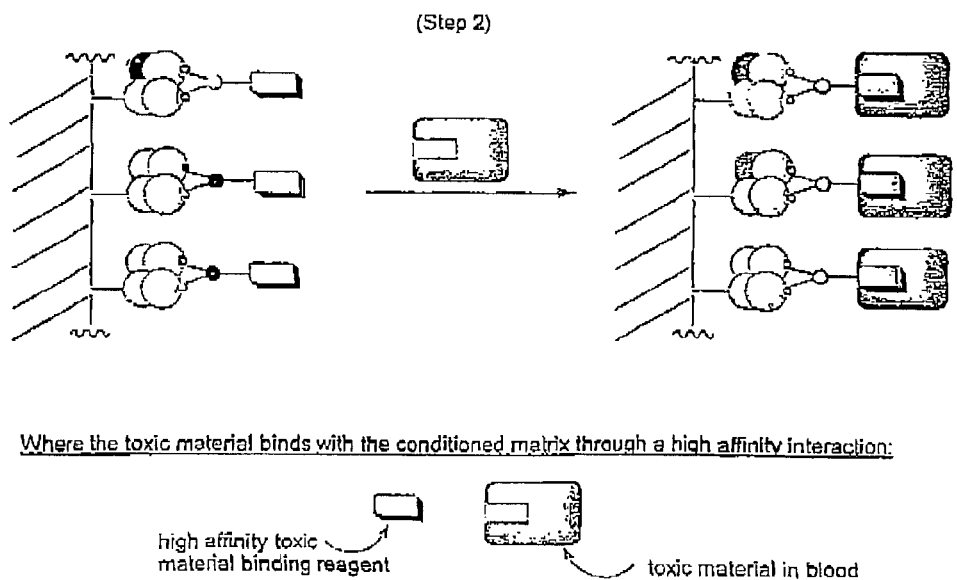

Figure 3: Generic structure of column conditioning reagent

```
   [Biotin]          [Biotin]
        \a         b/
          \       /
           ( )
            |c
       [Toxin
        Binding
        Moiety]
``` wherein *a* and *b* are linkers;
*a* may be the same as or different from *b*

Figure 4: Standard curve for biotin-trimer ELISA

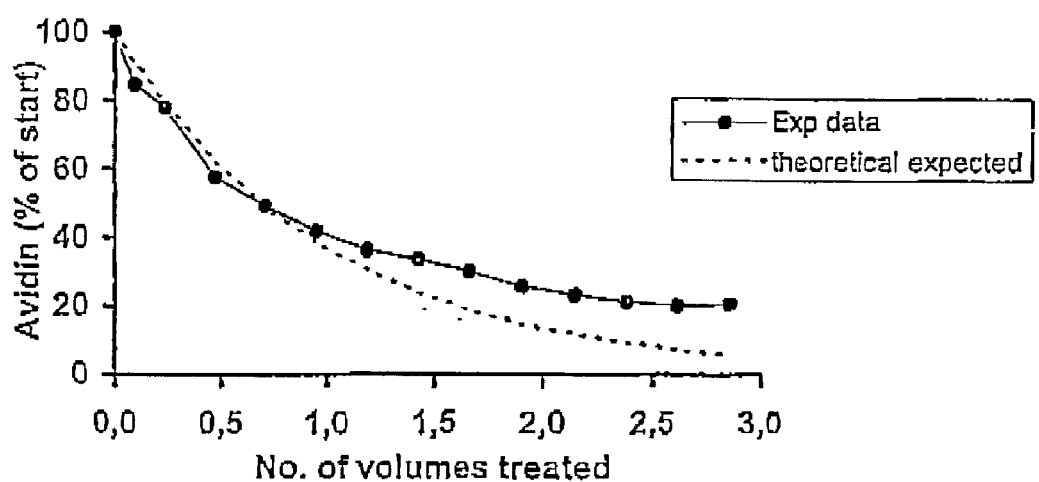
Figure 5: Depletion of Avidin by a biotin-trimer/Avidin column
Load: 20 mg

BIOTIN DERIVATIVES

RELATEDNESS OF THE APPLICATION

The subject application is a 35 USC §371 national phase of PCT Application Ser. No. PCT/SE01/01374, filed Jun. 18, 2001, entitled "Reusable Extracorporeal Columns Loaded with Ligand Dibiotin Conjugates", which claims the benefit of priority from U.S. Application Ser. No. 60/216,625, filed Jul. 7, 2000, now expired, and from Swedish Application No. 0002287-1, filed Jun. 16, 2000, now expired.

FIELD OF THE INVENTION

The present invention refers to a method for the conditioning of an extracorporeal device and to a method for extracorporeal extraction of toxic material from mammalian body fluids in connection with diagnosis or treatment of a mammalian condition or disease, in which methods reagents having the ability to extract toxic material from mammalian body fluids are involved, and to an extracorporeal device comprising said reagent.

BACKGROUND OF THE INVENTION

Toxic materials may be introduced into the blood of humans by accidents, from disease states, from bacterial or viral infections, or from administration of substances for treatment of certain diseases (e.g. cancer therapy). Many of these toxic materials may do considerable damage to body tissues such as kidney, liver, lung and bone marrow, and may even be fatal. It is desirable to remove such materials from the blood as quickly as possible. Although the body has natural defense mechanisms to remove unwanted toxic materials, those methods can be ineffective in many examples. Thus, certain toxic materials are best removed from the blood in an extracorporeal device. An example of such a device is the kidney dialysis machine, where toxic materials build up in the blood due to a lack of kidney function. Other medical applications where an extracorporeal device can be used include: [1] removal of radioactive materials, [2] removal of toxic levels of metals, [3] removal of toxins produced from bacteria or viruses, [4] removal of toxic levels of drugs, and [5] removal of whole cells (e.g. cancerous cells, specific hematopoietic cells—e.g. B, T, or NK cells) or removal of bacteria and viruses.

In order for the extracorporeal device to function in toxin removal, it must have a chemical entity bound on it that has a high binding affinity with the toxic material that is to be removed from blood. Rather than binding that chemical entity directly to the column matrix in the extracorporeal device, it is preferentially bound through another binding pair of molecules. This arrangement of binding is used to make the toxin binding moiety more available in the blood and to make the device more generally applicable to a variety of toxic materials. A column matrix material is used that provides a high surface area while not restricting the flow of blood through it (Nilson, R. et. al. EPC 567 514). The column matrix has a protein (avidin or streptavidin) bound to it that has a high affinity for another molecule (e.g. biotin). That column is conditioned for use in a particular medical application by conjugation of a moiety that has a high affinity for the toxic material with two molecules at biotin such that attachment to the column matrix can be readily achieved. This conditioning reagent contains two biotin moieties rather than one as this configuration provides a higher degree of stability to the column matrix.

Although, tumor-specific immunoconjugates are selectively bound to tumor cells, an initial high concentration of the cell-toxic immunoconjugate in the blood circulation is necessary to reach a sufficient high concentration of the target tissue in a patient. While required for optimal therapy of the cancer, the high concentration of cytotoxic material in the blood and other non-tumor tissues, in most cases leads to tissue damage and/or lesion formation in sensitive and vital tissues like the bone marrow. Although, bone marrow rescue is sometimes used to circumvent these potentially lethal effects, such transplantation is both extremely costly and possesses a high risk for the patient. Even in cases where the bone marrow transplantation is effective, other sensitive organs like the, liver, kidney, spleen, lung etc. can be irreparably damaged. The most effective method for preventing tissue and bone marrow damage from toxic materials in blood is to dramatically decrease the amount of that toxic material in the blood. Of course, this must be accomplished in a manner that retains the therapeutic level of toxic material in the tissue being treated (e.g. tumor).

Radiolabeled antibodies have been under investigation for therapy of cancer for several decades. Administration of radiolabeled antibodies introduces a toxic material into blood. Various methods have been proposed to rapidly clear radiolabeled antibodies from blood circulation after the tumor has accumulated a sufficient quantity of immunoconjugate to obtain a diagnosis or therapy. Some of the methods employed involve enhancement of the bodies own clearing mechanism through the formation of immune complexes. Enhanced blood clearance of radiolabeled antibodies can be obtained by using molecules that bind it, such as other monoclonal antibodies (Klibanov et. al., J. Nucl. Med. 29, 1951-1956, 1988; Marshall et al. Br. J. Cancer 69, 502-507, 1994; Sharkey et al. Bioconjugate Chem. 8, 595-904, 1997), avidin/streptavidin (Sinitsyn et al., J. Nucl. Med. 30, 66-69, 1989; Marshall et. al., Br. J. Cancer, 71, 18-24, 1995), or glycosyl containing compounds which are removed by receptors on liver cells (Ashwell and Morell, Adv. Enzymol. 41, 99-128, 1974). Still other methods involve removing the circulating immunoconjugates through extracorporeal methods (see review article by Schriber, G. J. & Kerr, D. E., Current Medical Chemistry, 1995, Vol. 2, pp 615-529).

The extracorporeal techniques used to clear a medical agent from blood circulation are particularly attractive because the toxic material is rapidly removed from the body. Application of these methods in the context of immunotherapy have been previously described (Henry C A, 1991, Vol. 18, pp. 565; Hofheinze D et al., Proc. Am. Assoc. Cancer. Res. 1987 Vol. 28, pp 391; Lear J K, et al. Radiology 1991, Vol. 179, pp. 509-512; Johnson T. K. et. al. Antibody Immunoconj. Radiopharm. 1991, Vol. 4, pp. 509; Dienhart D. G., et al. Antibody Immunoconj. Radiopharm. 1991, Vol. 7, pp. 225; DeNardo G. L. et al. J. Nucl. Med. 1993, Vol. 34, pp 1020-1027; DeNardo S. J. et. al. J. Nucl. Med. 1992, Vol. 33, pp. 862-863; DeNardo G. L. J. Nucl. Med. 1992, Vol. 33, pp. 863-864; and U.S. Pat. No. 5,474,772; Australian Patent 638061, EPO; and EPO 90 914303.4 of Maddock.

To make the blood clearance more efficient and to enable processing of whole blood, rather than blood plasma as the above methods refer to, the medical agents (e.g. tumor specific monoclonal antibody carrying cell killing agents or radionuclides for tumor localization) have been biotinylated and cleared by an avidin based adsorbent on a column matrix. A number of publications provide data showing that this technique is both efficient and practical for the clearance of biotinylated and radionuclide labeled tumor specific antibodies (Norrgren K, et. al. Antibody Immunoconj. Radiopharm.

1991, Vol. 4, pp 54; Norrgren K, et. al. J. Nucl. Med. 1993, Vol. 34, pp. 448-454; Garkavij M, et. al. Acta Oncologica 1996, Vol. 53, pp. 309-312; Garkavij M, et. al. J. Nucl. Med. 1997, Vol. 38, pp. 895-901. These techniques are also described in U.S. patent application Ser. No. 08/090,047; EPC 567 514 and Ser. No. 08/434,889).

Apart from the prolonged circulation time leading to undesired exposure of toxic immunoconjugate to healthy tissue, inadequate tumor tissue penetration and non-specific organ retention and metabolism contribute to a low therapeutic index ratio. Due to these problems, multi-step antibody-based radionuclide delivery approaches have been extensively investigated. The basic concept involves first the injection of a lesion-specific targeting moiety which apart from binding specifically to the lesion also has the feature of binding to a subsequently injected radioactive diagnostic agent or a therapeutic agent. By separating these two events one can allow the slow tissue penetrating non-radioactive/non-cytotoxic antibody sufficient time to accumulate in the tumor mass, while the agent carrying the radionuclide/cytotoxin could be selected for more rapid tissue penetration. However, a prerequisite is that the former (and preferably also the later) can be cleared rapidly from the blood circulation.

Most of these multi-step approaches utilize binding pairs of avidin/streptavidin and biotin. Avidin is a 67 kDa glycoprotein found in egg whites and tissue of birds and amphibia. It consists of 4 non-covalently bound subunits. Each subunit is capable of binding one biotin molecule. Avidin has a high isoelectric point (pI>10), due to its 36 lysine amino acid residues, which results in non-specific binding to cellular membranes. Streptavidin (SAv), produced in *Streptomyces avidinii*, is a close relative of avidin. It shares high affinity to biotin, but differs in amino acid content as well as net charge (pI 6.5) and is not glycosylated. Due to lack of sugar groups, SAv has a slightly lower molecular weight of 60 kDa and the in vivo pharmacokinetics and biodistribution differs markedly from avidin. Whereas intravenous injection of radiolabelled avidin clears rapidly from the blood and accumulates extensively in the liver, radiolabeled SAv exhibits a much longer circulation time, and has lower organ accumulation (Pima M V et al. Nucl. Med. Comm. 1988 Vol. 9, 931-941; Schechter B et al., Eur. J. Biochem. 1990, Vol. 189, 327-321; Rosebrough S F, Nucl. Med. Biol. 1993, Vol. 20, 663-668).

The other part of the binding pair, biotin, is a vitamin and a member of the B-complex, which is essential for amino acid and odd-chain fatty acid synthesis. Biotin in found preferentially intracellular, usually bound to an enzyme and acts as a co-factor during carboxylation reactions. Biotin is often present as a lysine-biotin adduct (biocytin), in food and during metabolic protein turnover. The linkage between lysine and biotin is cleaved by a plasma enzyme, biotinidase.

To improve the imaging in patients with carcinoma of the lung, Kalofonos et. al. used a two-step SAv-MAb/111In DTPA-biotin approach (Kalofonos H P et al., J. Nucl. Med. 1990, Vol. 31, 1791-1796). Van Osdol et. Al. And Sung et. al. have developed a mathematical model of two-step imaging, and treatment protocols using SAv-MAb and radiolabelled biotin chelates. Taken into account the in vivo parameters of both the targeting SAv-MAb moiety and the radiolabelled biotin imaging agent, they predicted the following:

1) The large molecular weight of SAv-MAb will reduce the amount of MAb that will localize in the tumor and the binding homogeneity in the tumor.

2) Radiolabelled biotin will diffuse rapidly into the tumor, but due to the high affinity to peripheral tumor-bound SAv-Mab, will not penetrate deeply into the nodule if too low dose is given.

3) Compared to directly labeled MAbs, the two-step SAv-MAb/radiolabelled biotin protocol permits imaging sooner after radioactive injection and produced higher tumor/blood ratios.

4) That tumor/blood ratios at 24 hrs are >2 times higher that with the use of directly labeled MAbs.

In their simulation, a high percentage of the radio activity is bound to circulating SAv-MAb and that the addition of clearing agent before radiolabelled biotin was injected would enhance the tumor blood ratio.

A two-step approach using biotinylated MAbs and radiolabelled SAv has also been utilized in animal models as well as in patients (Paganelli G. et. al. Eur. J. Nucl. Med. 1992, Vol. 19, 322-329; Khawli L A et al. Abs. Immunoconj. Radiopharm. 1993 Vol. 6, 13-27; Kassis A I. et. al. J. Nucl. Med. 1996 Vol. 35, 1358-1365). In this method, both the targeting and the imaging agents are of large molecular weight and clear slowly from the blood. The whole procedure takes many days to complete and with metabolism, radioactivity accumulates in organs and is slowly eliminated from the body. Nevertheless, these studies showed that biotin/SAv binding was accomplished in vivo and yielded positive images and enhanced tumor activity compared to directly labeled MAbs.

A three-step procedure consisting of biotinylated MAb, avidin and then followed by 111In-DTPA-biotin has also been tried (Paganelli G et al. Canc. Res. 1991 Vol. 51, 5960-5966; Dosio F. et. al. J. Nucl. Biol. Med. 1993 Vol. 37, 228-232). This procedure required 1-3 days between injections to allow for tumor accumulation and blood clearance. As a whole, all these studies have shown the feasibility of immunological approaches utilizing the SAv/biotin system in vivo. However, circulating levels of the high molecular weight targeting agents were problematic due to their prolonged circulation and non-specific organ accumulation.

An alternative pretargeting approach uses three separate injections of three components: [1] SAv-Mab, [2] a clearing agent, and [3] a radiolabelled biotin derivative containing the radiometal chelation moiety DOTA has been thoroughly investigated (Axworthy D B et al. J. Immunother. 1994, Vol. 16, 158). A covalent conjugate of tumor-specific MAb and SAv is injected and is allowed to accumulate at tumor sites. After sufficient tumor uptake (24-48 hrs) a biotin clearing agent is administered in order to clear the blood from the conjugate through the liver. Finally, the radiolabelled biotin-DOTA derivative is injected. The clearing agent used in this context is typically a biotinylated protein to which galactose residues have been conjugated. The galactose receptors resides on hepatocytes and exhibit a high affinity and specificity for macromolecules with exposed terminal galactose residues. The hepatic uptake correlate with the amount of galactose residues bound to SAv (Rosebrough S F, J. Nucl. Med. 1996, Vol. 37, 344-350).

In all these concepts there is bound to be a conflict between initial concentration of the targeting molecule and its ability to penetrate deep into the tumor on one hand, and a rapid and complete clearance from the blood prior to administration of the radioactive/cytotoxic agent, on the other. In principle, the same condition applies for the radioactive/cytotoxic agent. A sufficiently high initial blood concentration is essential to reach and saturate the targeting molecule. At the same time this toxic agent must not reside in the blood circulation and exposing sensitive tissues like the bone marrow. Even if the toxic agent is cleared fairly rapidly through the body, organs like the kidney and the urinary track will normally receive an accumulated toxic dose equally or higher to that received by the tumor tissue.

There is clearly a need for optimizing these and other therapy protocol conditions, particularly it the approaches are going to be adequate for the treatment of solid tumors. It is vital that such concepts are to a large extent generic, in so far that as many as possible of the parameters are independent on the type and localization of the disease and as much as possible independent on the pharmacokinetic parameters and rate of metabolisms of the individual patient.

SUMMARY OF THE INVENTION

The object of the present invention is to eliminate the above-mentioned problems with toxic or undesired compounds in body fluids. This object is achieved with a method according to the present invention for the conditioning of an extracorporeal device and a method for the extracorporeal extraction of toxic material from mammalian body fluids in connection with diagnosis or treatment of a mammalian condition or disease, in which methods a reagent is used having the ability to extract toxic material from body fluids and comprising the general formula:

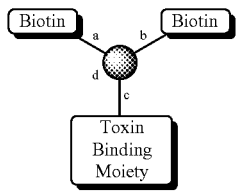

wherein the biotin moieties are natural biotin or derivatives thereof, wherein a, b, and c axe linkers, which are same or different, and wherein d is a trifunctional crosslinking moiety, said reagent is alternately called conditioning reagent in the description, or with preferred embodiments of said methods, in which the toxin binding moiety of the reagent is biotin or a derivative thereof for the extracorporeal extraction of toxic material from mammalian body fluids in connection with diagnosis or treatment of a mammalian condition or disease. Other objects and advantages will become apparent from the detailed description of the invention and the appended subclaims.

In one aspect of the present invention, reactive dibiotin compounds are coupled with ligands that selectively bind with components naturally found in, or artificially introduced into, blood, and the resulting conjugates are used to condition avidin or streptavidin containing column matrixes for medical applications. In another aspect of the present invention, an extracorporeal device containing a column that has been conditioned with the dibiotin conjugate is connected to an apparatus that pumps whole blood from patients through the column and back into the patient to cleanse the patients blood of materials that bind with the dibiotin conjugate. Thus, the objective of the present invention is also to facilitate the use of extracorporeal clearance of toxic agents by providing means of a one step conversion of a biotin-binding device to toxic substance binding device by the use of water soluble molecule that contains two biotin moieties.

Other aspects, wherein the reagent is tribiotinylated, are described in the following examples.

SHORT DESCRIPTION OF THE DRAWINGS

FIG. 1 illustrates the conditioning of a (strept)avidin matrix with derivatized dibiotin compounds.

FIG. 2 illustrates the binding of toxic material with a conditioned column.

FIG. 3 illustrates the generic structure of the column conditioning reagent.

FIG. 4 shows a standard curve for biotin-trimer ELISA.

FIG. 5 shows a typical depletion curve of avidin by an biotin-trimer/avidin column.

DISCLOSURE OF PREFERRED EMBODIMENTS

The present invention also involves a conditioning method for converting a biotin-binding matrix to a matrix that can bind a variety of substances toxic to the body. Specialized avidin or SAv coated columns are used in the invention as these provide a binding surface for toxic compounds (e.g. radiolabeled antibodies) which have biotin attached (Nilsson. R. et. al., EPC 567 514). These columns have the proper characteristics for passing whole blood over them and obtaining good clearance in a reasonable time period. The present invention greatly expands the use of the avidin/SAv columns by their conversion to hind other types of molecules in a two step process. In the first step, column conversion from the biotin-binding (strept)avidin coated column to a column that hinds a toxic material can be accomplished by conditioning it with an excess of a dibiotin derivative as shown in FIG. 1. In a second step, the conditioned column can be used in an extracorporeal device to rid the blood of the toxic substance. Binding of the toxic substance with the conditioned column is depicted in FIG. 2. The two steps can be separated by time with storage of the conditioned column.

In a preferred embodiment of the invention, a toxic medical agent used for therapy of human disease is removed from the blood to improve its ratio of target-to-non-target concentration. An improved target-to-non-target ratio provides a better therapeutic index. Specific tissue or organ localization of a medical agent is a very important factor in its effective application. Lack of specific tissue localization is of particular importance in the treatment with medical agents, where the desired effect is to kill certain types of cells such as in the treatment of cancer. In order to enhance the specificity, tumor specific monoclonal antibodies are used as a carrier (immunoconjugates) of various cytotoxic agents, such as, but not limited to, radionuclides, cytotoxins, and enzymes used in pro-drug protocols (Meyer et al., Bioconjugate Chem. 6, 440-446; 1995; Houba et al., Bioconjugate Chem. 7, 606-611, 1996; Blakey et al., Cancer Res. 59, 3287-3292, 1996).

The term "reagent" (also "conditioning reagent") used herein means a compound containing two functions for specific interaction with a single biotin binding molecule and a separate function for the binding of toxic material. It can be used to convert a biotin binding matrix to a matrix that can be used to extract specific toxic material from body fluids or be used to convert a biotin binding matrix to a matrix which binds biotin binding molecules.

The term "effector molecule" used herein means any moiety which can be linked to a targeting molecule or to a molecule interacting with a targeting molecule (targeting molecule complex) and which either enhances the effect of the targeting molecule/targeting molecule complex or which alone contribute to a desirable pharmacological or diagnostic effect.

The term "toxic material" used herein means any compound, optionally in a conjugate with an effector molecule, cluster of compounds, cells etc. which can be extracted from mammalian body fluids by the use of the reagent.

The term "toxic binding moiety" used herein means any moiety capable of extracting toxic material from mammalian body fluid by specifically interacting with the toxic material. In some preferred embodiments of the present invention the toxic binding moiety is biotin or a derivative thereof.

The term "biotinylated molecules" used herein means molecules that penetrates mammalian tissue more readily than immunoglobulins, e.g. a radiolabelled biotin derivative containing a radiometal chelation moiety.

The term "targeting biomolecule" used herein means biomolecules which selectively bind to certain structures on mammalian cells.

For affinity adsorbents the matrix (M) may be of various shape and chemical composition. It may for example constitute a column house filled with particulate polymers, the latter of natural origin or artificially made. The particles may be macroporous or their surface may be grafted, the latter in order to enlarge the surface area. The particles may be spherical or granulated and be based on polysaccharides, ceramic material, glass, silica, plastic, or any combination of these or alike material. A combination of these could for example be solid particles coated with a suitable polymer of natural origin or artificially made. Artificial membranes may also be used. These may be flat sheet membranes made of cellulose, polyamide, polysulfone, polypropylene or other types of material which are sufficiently inert, biocompatible, non-toxic and to which the receptor could be immobilized either directly or after chemical modification of the membrane surface. Capillary membranes like the hollow fibers made from cellulose, polypropylene or other materials suitable for this type of membranes may also be used. A preferred embodiment is a particulate material based on agarose and suitable for extracorporeal applications.

The biotin-binding molecule may be immobilized to matrix by various methods. The coupling method of choice will depend on the nature of the biotin-binding molecule as well as the nature of the support matrix. For proteins, functional groups such as hydroxyl-, amino-, carboxyl- or thiol-groups may be utilized. Glycoproteins like avidin may be coupled to the matrix via their glycosyl residues. The solid support may also be activated to enable binding of proteins by forming linkages with the solid support through specific or non-specific reaction with the side-chains or the backbone structure of the protein. The linkage between the solid support and the biotin-binding molecule may also be of non-covalent nature, where electrostatic, hydrogen bonding or hydrophobic forces are utilized. For applications in immunoassays a non-covalent attachment would be most appropriate. A spacer between the matrix and the biotin-binding molecule may also be used.

The conditioning reagent is composed of a molecule that has two biotin moieties as well as a toxic material binding moiety. Two biotin moieties are important in the invention as this arrangement allows both biotin moieties to bind with the same (strept)avidin molecule on the column, which cross-links the subunits and helps to stabilize the column to the conditions of blood movement through it. Cross-linking of biotin moieties with adjacent (strept)avidin moieties does not occur as the biotin dimers bind much more rapidly with the adjacent biotin binding pocket (intramolecular binding) rather than with a biotin binding pocket on an adjacent molecule (inter-molecular binding) [Wilbur et al. Bioconjugate Chem. 8, 819-832, 1997). Avidin and streptavidin are more stable when biotin is bound, and cross-linking the subunits provides additional stability (Biomolecular Engineering 16, 67-72, 1999).

The conditioning reagent is comprised of two biotin moieties, a toxin binding moiety, a trifunctional cross-linking moiety, and three linker molecules (a-c) as depicted in FIG. 3. The two biotin moieties are comprised of natural biotin or biotin derivatives coupled to the linker molecule(s) (a,b) through the biotin carboxylate via an amide bond. The biotin moieties are coupled to the trifunctional cross-linking reagent through linker molecules that provide a minimum of 20 Å and a maximum of 60 Å between the biotin carboxylate carbon atoms when measured in a fully linearized form. Linker molecules a, b and c, also called linkers for short, may be the same or each linker may be of a different nature. The linker molecules are linear or branched chained and contain water solubilizing functionalities such as ether/thioether bonds, amines, in the chain, or appendages to the chain which contain amines, carboxylates or hydroxyl functionalities. The atom on the linker alpha to the biotinamide bond may be unsubstituted (e.g. $CH_2$) or may contain a methyl, hydroxymethylene, or carboxylate functionality. Larger functionalities diminish the binding with (strept)avidin columns. The later functionalities provide stability from biotinidase, but this stability is not required for the two biotin moieties binding with (strept)avidin on the columns as they are not available for cleavage by biotinidase. When the toxin binding moiety is another biotin moiety, the biotinidase stability may be desired. The trifunctional cross-linking reagent is an aliphatic or aromatic compound that contains three functional groups that are nucleophiles, or are reactive with nucleophiles, for conjugation with the linker molecules. Preferred trifunctional cross-linking reagents are aromatic rings with 1,3,5-substitution. Most preferred are derivatives of 1,3,5-benzene tricarboxylic acid, 3,5-diaminobenzoic acid, 5-amino-1,3-dicarboxybenzene (aminoisophthalic acid). The toxin binding moiety is any molecule that binds to a toxic substance with high affinity. Examples of such binding molecules include monoclonal antibodies (or fragments or genetically engineered counterparts), aptamers, peptides, oligodeoxynucleoside (or binding fragments), intercalation reagents (e.g. dyes, chemotherapy agents, natural substances), and metal chelates that specifically bind with the toxin or an effector molecule attached to the toxic material. Examples of toxic materials include: metal ions, chemotherapy agents, free radionuclides, radionuclides bound to other compounds, ingested toxins, toxins produced by bacteria, toxins produced by viral infections, toxins produced by disease states, diseased cells, cells involved in the immune response, blood group or HLA incompatibility as well as incompatibility with xenoantibodies. etc.

The preferred biotin residue is biotin or a derivative thereof. In most examples the biotin moiety will be natural biotin, which is coupled to a linker through an amide bond. In some examples it may be advantageous to have a biotin derivative that does not bind as tightly as natural biotin, or a biotin derivative that binds to chemically modified, or genetically mutated, avidin or streptavidin in preference to natural biotin. Example of such biotins are norbiotin, homobiotin, oxybiotin, iminobiotin, desthiobiotin, diaminobiotin, biotin sulfoxide, and biotin sulfone. Other modifications of biotin, including further modification of the above examples are also included. The two biotin moieties in the reagent according to the present invention may alternatively be comprised of any of the biotin derivatives listed above.

In a preferred embodiment of the invention, the toxin binding moiety is biotin or a biotin derivative. Conditioning of the avidin or streptavidin column with this reagent (tribiotin reagent) permits removal of toxic materials that are combined with avidin or streptavidin (or these reagents which are chemically modified, truncated by enzymatic digestion, or altered through genetic mutation methods). Examples of a preferred conditioning reagent that contains 3 biotins is shown in Scheme 1. A preferred medical application for this conditioning reagent is to remove from a patient's blood, avidin or streptavidin that has a therapeutic radionuclide bound to it. In the examples shown (compounds 1-3) the conditioning are the same except for the nature and length of the linker group. The cross-linking reagent employed is 1,3, 5-benzene tricarboxylic acid, and the linkers used contain ether functionalities for water solubilization. In compound 3, the linker also contains aspartic acid which provides a free carboxylate to aid in water solubilization and to block the action of biotinidase.

Scheme 1: Example of biotin dimers that also contain a third biotin for binding radiolabeled streptavidin derivatives A. Biotin trimer with 31 A between biotin carboxylates

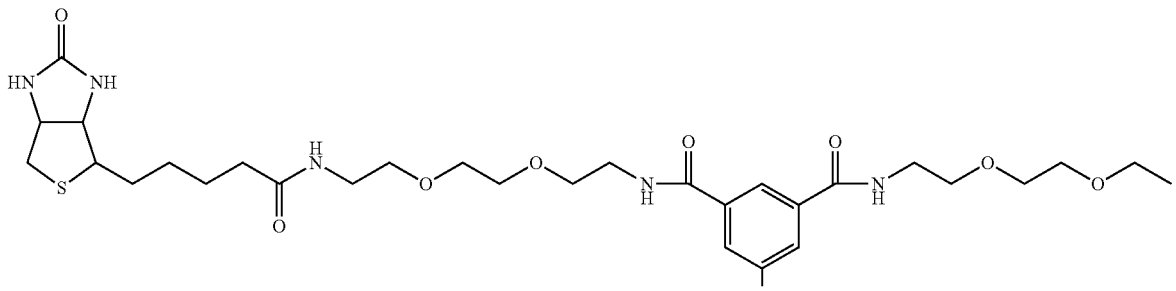
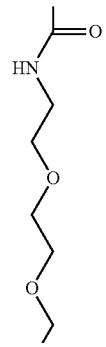
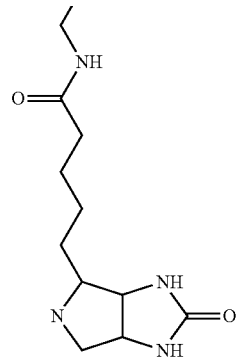
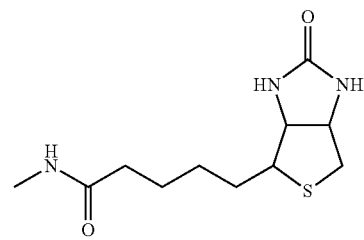

1

-continued
B. Biotin trimer with 41 A between biotin carboxylates
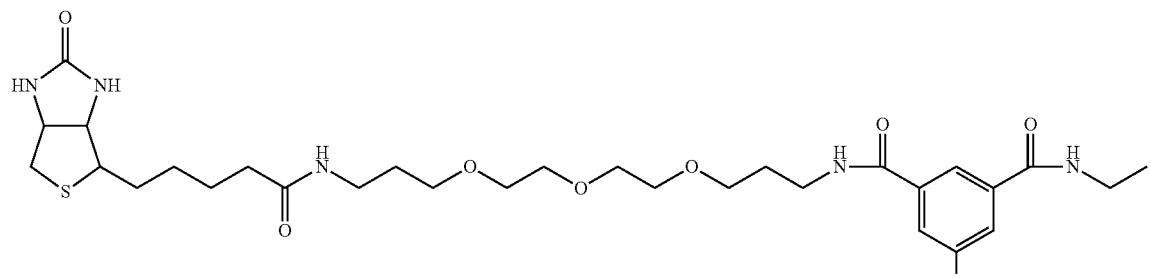
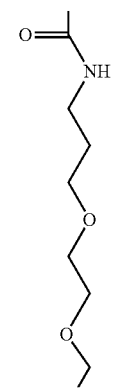
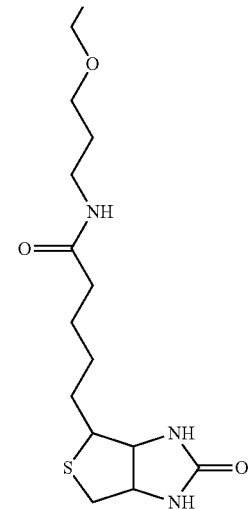
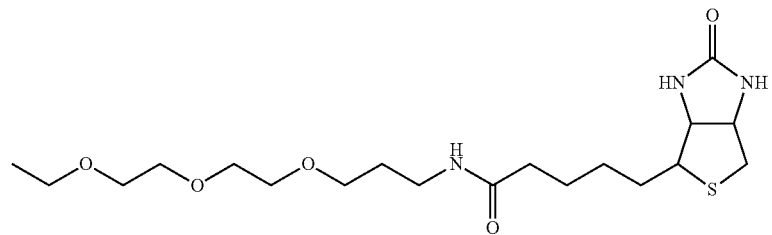

C. Biotin trimer with 53 A between biotin carboxylates
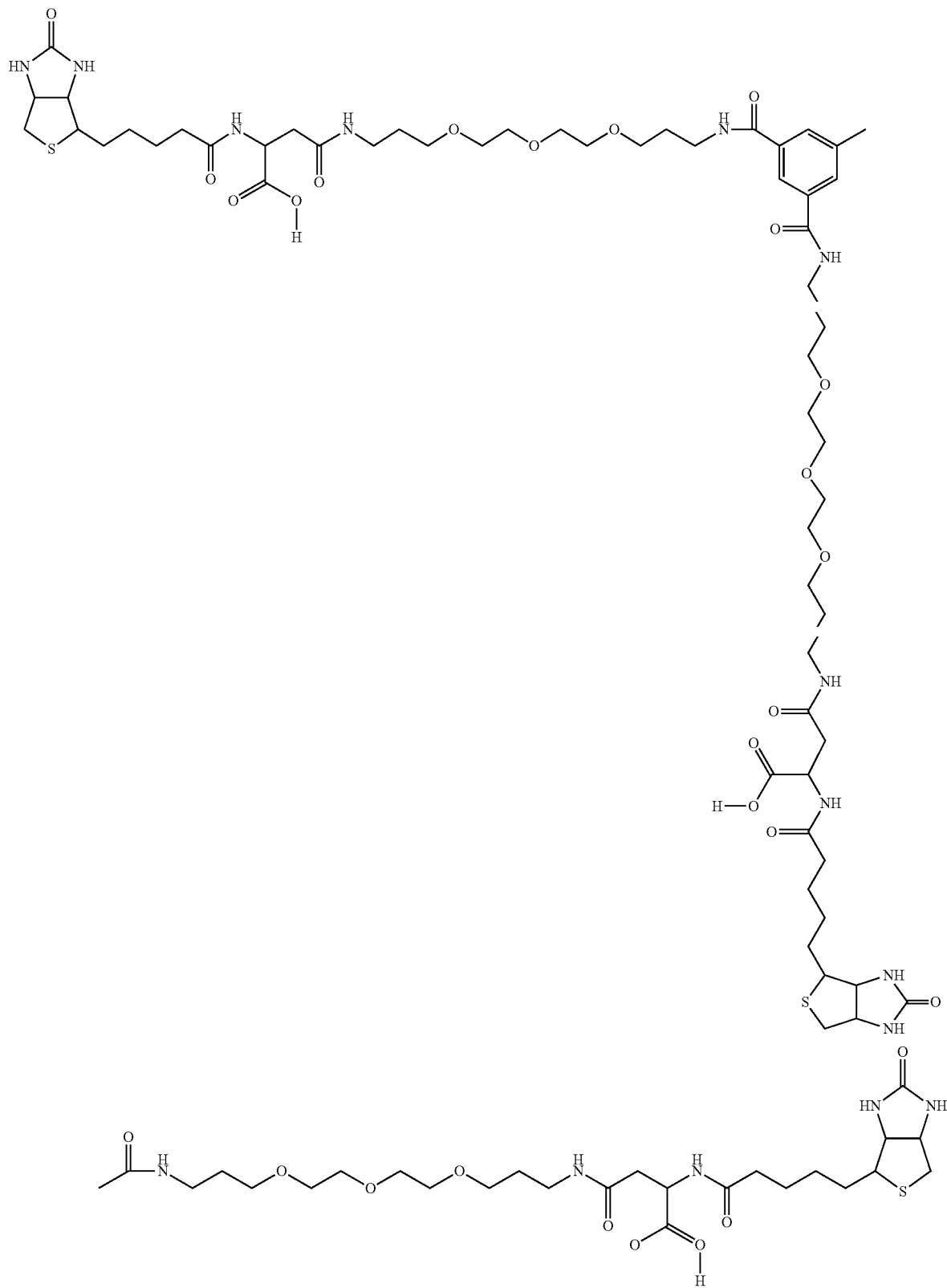

Other toxic material binding dibiotin conditioning reagents involved in the methods according to the present invention can be readily prepared by conjugating a nucleophile containing, or nucleophile reactive, dibiotin compound with the toxic material binding moiety. Examples showing the synthesis of reactive dibiotin compounds are provided in Schemes 2 and 3. The tetrafluorophenyl ester activated and N-tBoc protected aminoisophthalate, 4, is used as the trifunctional cross-linking reagent in these examples. Reaction of 4 with biotin-conjugated to the linker, 4,7,10-trioxatridecanediamine provides dibiotin compound 5. The N-tBoc protection group in 5 is readily converted to the free amine, 6, with neat trifluoroacetic acid. Aniline compound 6 is reactive with toxic material binding compounds that contain activated carboxylate esters or that will undergo other nucleophilic displacement reactions. The free amine of 6 is also readily converted to functional groups that are reactive with nucleophiles (e.g. isothiocyanate, 7; maleimide, 8, or other reagents such as alpha-halo acetamides). The isothiocyanato-dibiotin compound 7 is reactive with toxic material binding molecules that contain amines, and the maleimido-dibiotin 8 is reactive with toxic material binding molecules that contain sulfhydryls (also amines). Additional reactive reagents can be readily prepared in the same manner. A reagent that is reactive with oxidized sugars and alcohols is the hydroxylamine derivative 10. In the examples in Scheme 2, the linker c is either not present or is first attached to the toxic material binding molecule. In many examples, a linking molecule will be desired to make the toxic material binding moiety more available for interaction with the toxic material in blood. Therefore, a linker may be built into the molecule prior to reaction with the toxic material binding molecule. Examples where a linker molecule has been incorporated are shown in Scheme 3 (compounds 11-14)

17 18
-continued
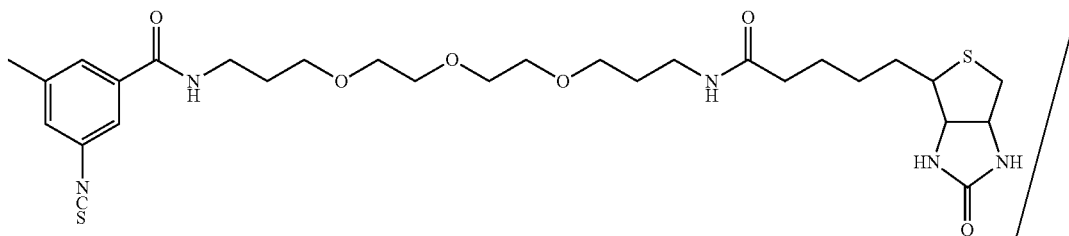
7
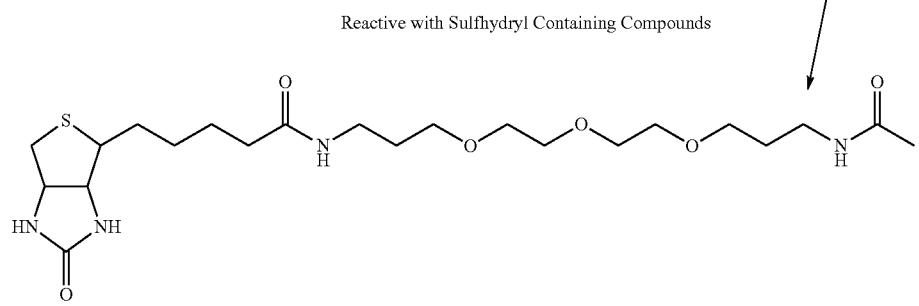
Reactive with Sulfhydryl Containing Compounds
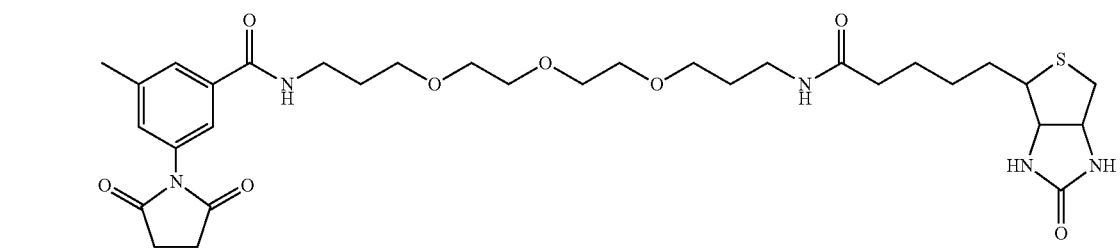
8
Reactive with Aldehydes, Ketones, and Oxidized Carbohydrate Containing Compounds
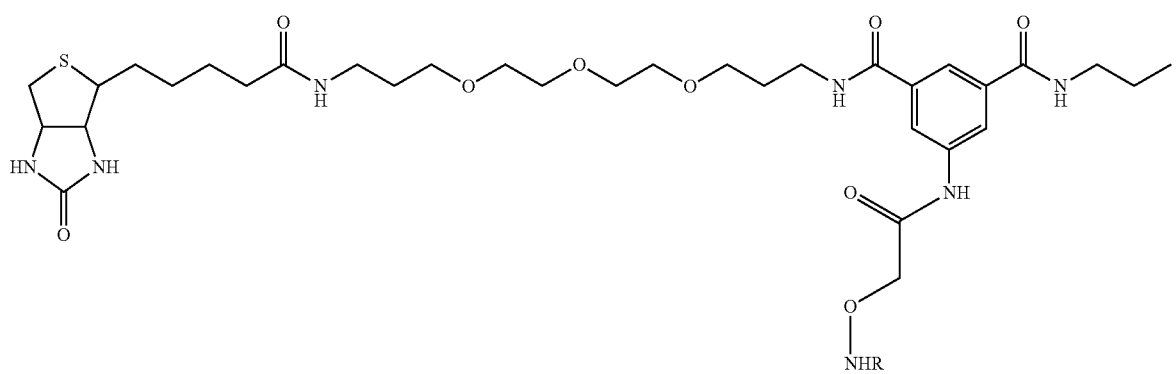
9: X = tBoc
10: X = H -continued
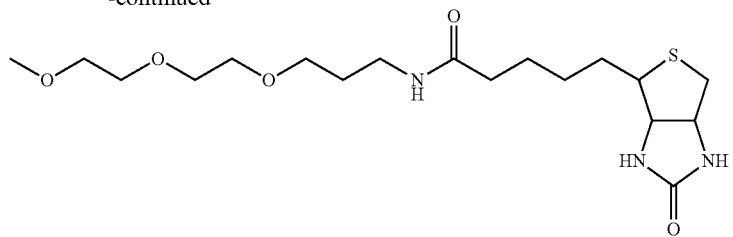
Scheme 3: Synthesis of dibiotin reagents which contain a linker moiety and have functional groups which permit conjugation with other molecules
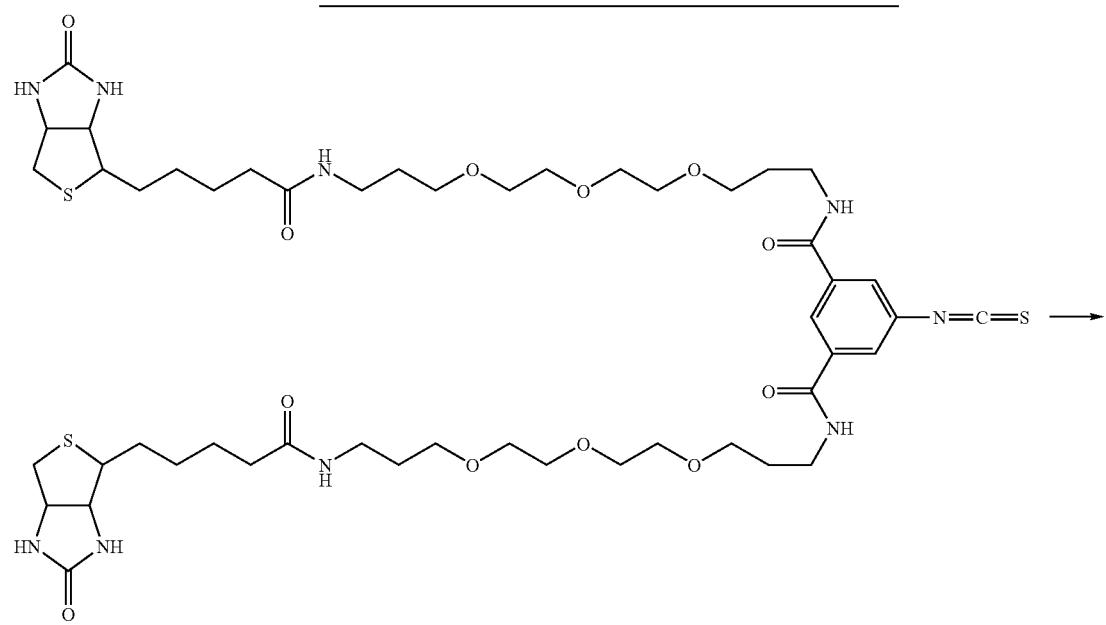
7
Reactive with carboxyists containing compounds
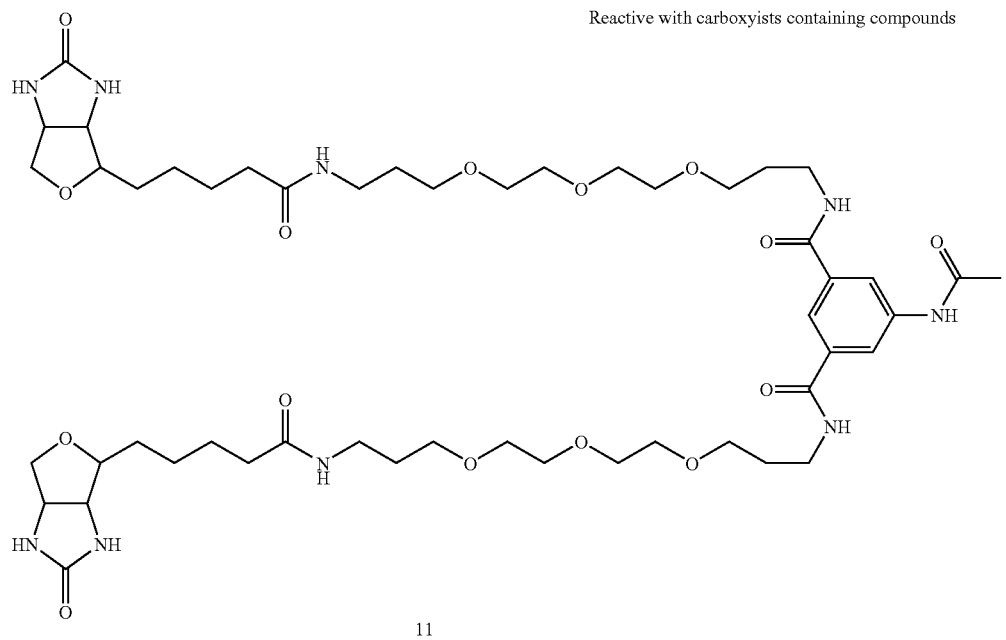
11

-continued
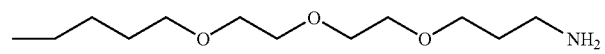
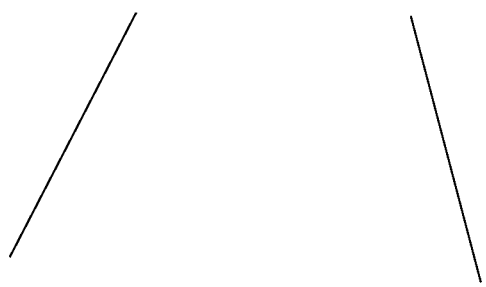
Reactive with amine containing compounds
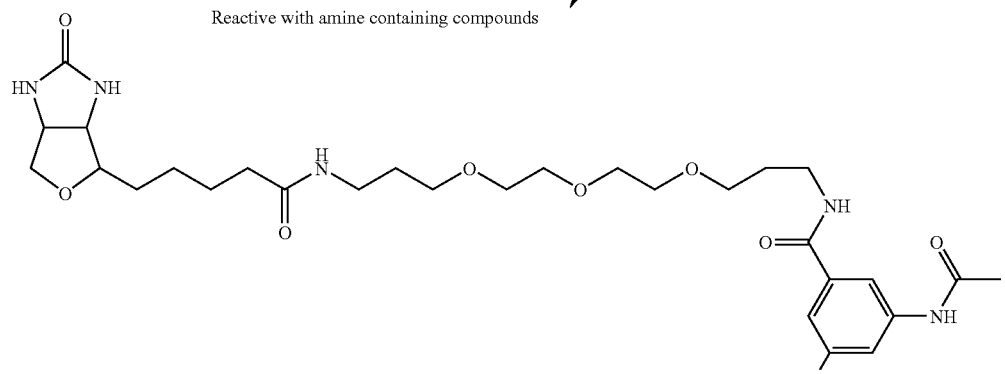
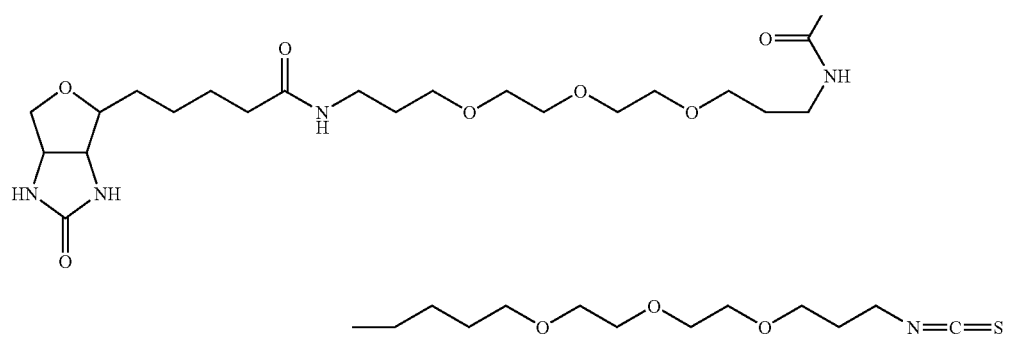
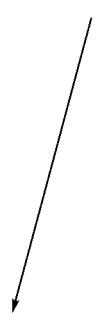

-continued
Reactive with sulfhydryl containing compounds
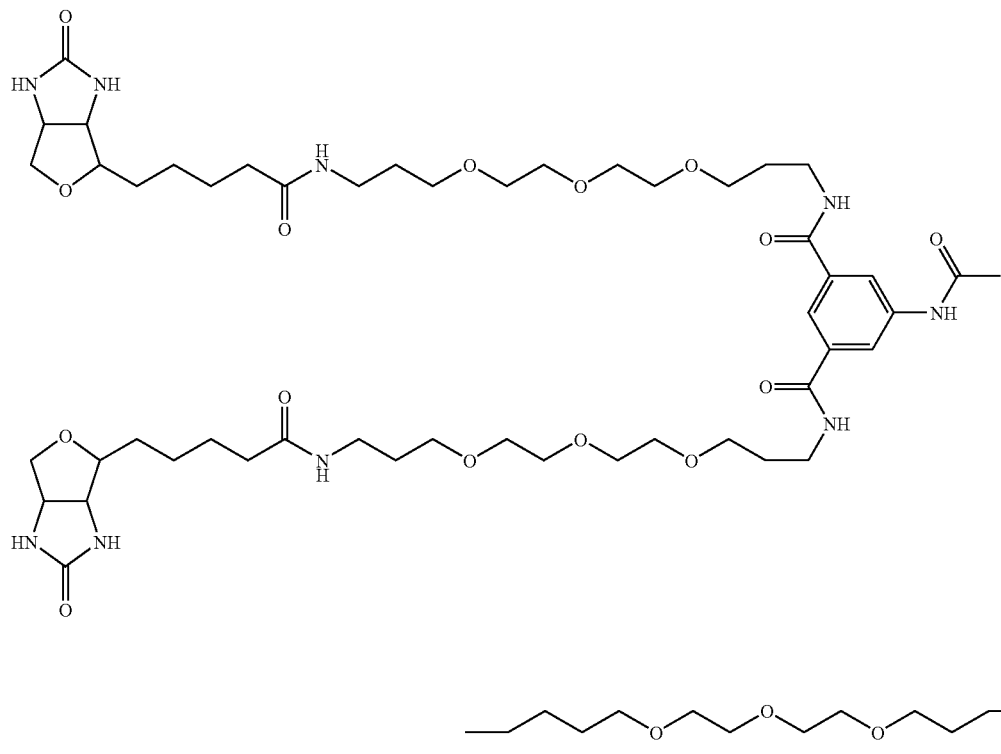
13
Reactive with aldehyde, ketone or oxidized carbohydrate containing compounds
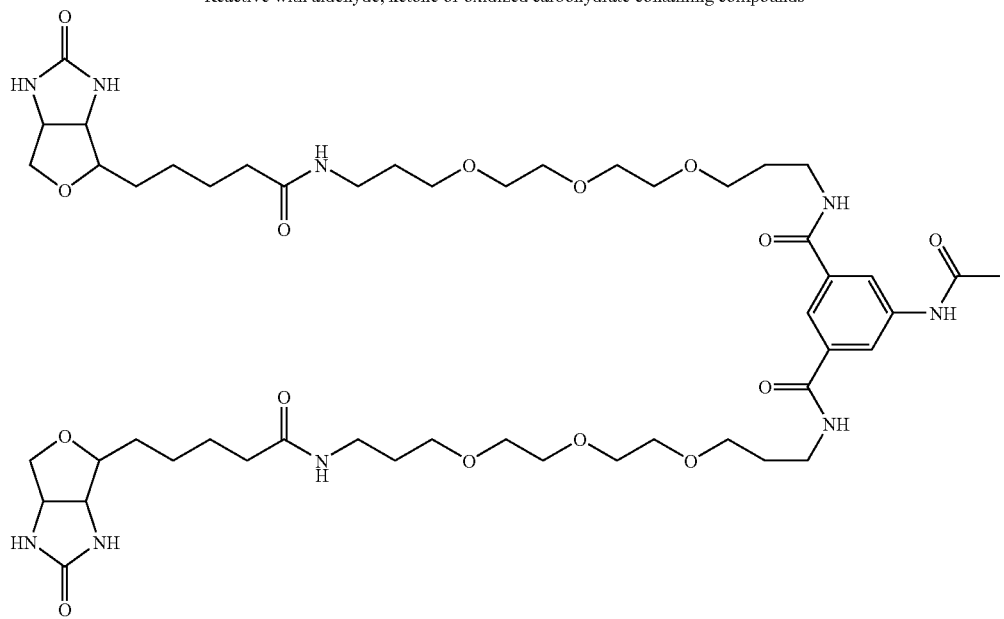

-continued

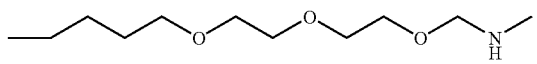

14

EXAMPLES

The following examples are provided to show methods for obtaining various types of compounds disclosed in this patent and their use as a reagent in conditioning the column for toxin removal from whole blood. The examples are provided by way of illustration, and not by way of limitation. Many further examples can be envisioned from the examples shown here.

Example 1

Preparation of a Dibiotin Compound that can be Conjugated with Toxin Binding Molecules

Step 1: Preparation of N-tert-Boc-5-aminoisophthalic acid

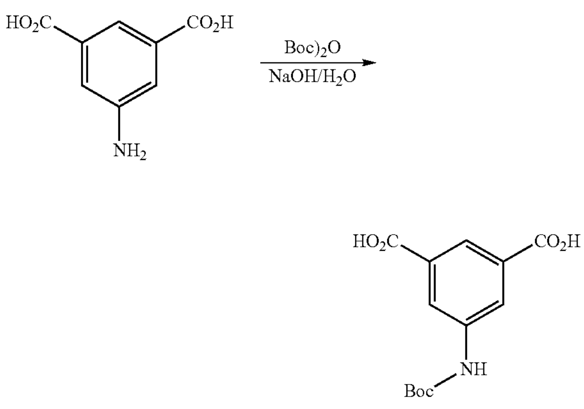

Di-tert-butyl dicarbonate (1.27 g, 5.80 mmol) was added to a solution of 5-aminoisophthalic acid (1.0 g, 5.52 mmol), sodium hydroxide (0.49 g, 12.14 mmol), DMF (10 mL) and water (10 mL) at ice/water bath temperature. The reaction mixture was stirred at ambient temperature for 16 h. The solution was neutralized with 53.0 mL of 0.5 N HCl at ice/water bath temperature, then the white precipitate was filtered, washed with water, and dried under vacuum. The residue was crystallized from MeOH/$H_2O$ to give the pure compound as a white solid. Yield 0.94 g (61%). mp>300° C. 1H NMR (DMSO-d6): δ 1.50 (s, 9H), 8.08 (t, J=1.5 Hz, 1H), 8.31 (d, J=1.5 Hz, 2H), 9.80 (s, 1H). HRMS calcd.

1 cd for $C_{13}H_{16}NO_6$ (M+H)+: 282.0977. Found: 282.0981. HPLC: tR=11.3 min.

Step 2: Preparation of N-tert-Boc-5-aminoisophthalate di-tetrafluorophenyl ester 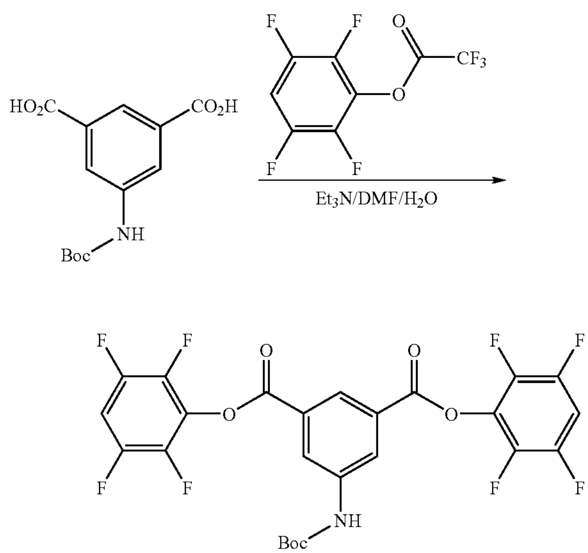 2,3,5,6-Tetrafluorophenyl trifluoroacetate (0.47 mL, 2.71 mmol) was added dropwise to a solution of tert-Boc-5-aminoisophthalic acid (0.35 g, 1.23 mmol), $NEt_3$ (0.52 mL, 3.70 mmol), DMF (4.0 mL) and water (10 mL) at room temperature. A 60 mL quantity of water was added after the reaction mixture was stirred at room temperature for 30 min, the white precipitate was filtered, washed with water, dried in vacuo to give the crude product. The crude product was purified by silica gel column chromatography (40 g) eluting with 10% EtOAc/-hexane to give a colorless solid. Yield 0.213 g (30%). mp 159.7-161.8° C. dec. 1H NMR (CDCl3):

1.55 (s, 9H), 6.83 (s, 1H), 7.08 (m, 1H), 8.54 (d, J=1.5 Hz, 2H), 8.67 (t, J=1.5 Hz, 1H). HRMS calcd for $C_{25}H_{15}F_8NNaO_6$ (M+Na)+: 600.0669. Found: 600.0674. HPLC: tR=

16.1 min.

Step 3: Preparation of
N-(13-amino-4,7,10-trioxa-tridecanyl)biotinamide

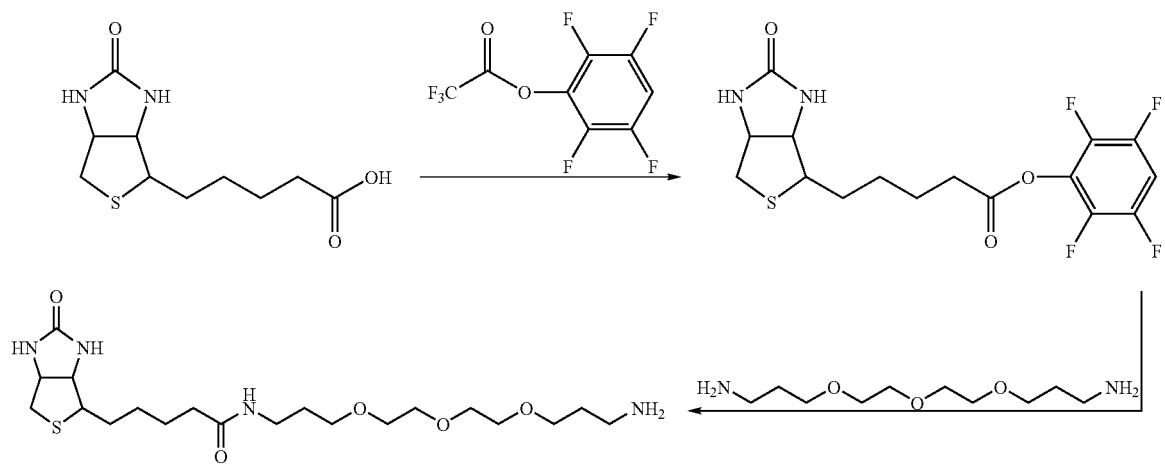

Biotin (10 g, 40.9 mmol) was dissolved in 200 mL warm (70° C.) DMF under argon atmosphere. The solution was allowed to cool to ambient temperature, 10 mL (82 mmol) triethylamine was added, followed by the addition of 16 g (61 mmol) 2,3,5,6-tetrafluorophenyl trifluoroacetate. The reaction was stirred at room temperature for 30 min and solvent was removed under vacuum. The product was triturated in 100 mL ether and was filtered. The isolated product was dried under vacuum to yield 14 g (83%) of biotin TFP ester as a colorless solid, mp 185-187° C. 1H NMR (DMSO-d6, ( ): 1.4-1.8 (m, 6H), 2.5 (m, 1H), 2.6-2.9 (m, 3H), 3.1 (m, 1H), 4.2 (m, 1H), 6.4 (d, 2H), 7.9 (m, 1 H); IR (KBr, cm-1) 3250, 2915, 1790, 1710, 1520, 1480, 1090. Analysis calc. for $C_{16}Hl_6F_4N_2O_3S$: C, 48.98; H, 4.11; N, 7.14. Found: C, 48.90; H, 4.14; N, 6.86.

Biotin TFP ester (5 g, 12.8 mmol) was added to a dry flask containing 200 mL anhydrous DMF. In another dry flask containing 28 g (128 mmol) 4,7,10-trioxa-1,13-tridecanediamine, 8, was added 4 mL of triethylamine. Both flasks were cooled to 0-5° C. with ice-water baths. The TFP ester of biotin was added dropwise to the tri-oxatridecanediamine solution over the period of 1 h. The reaction was stirred at room temperature for 30 min and the solvent was removed under vacuum. The resulting oil was triturated in 500 mL ether and was stirred for 30 min. The solid was filtered, then dissolved in methanol:ethyl acetate (4:1), and loaded onto a silica column (2.5 cm×35 cm). The column was eluted with the same solvent mixture. Fractions containing product were collected, and solvent was removed under vacuum. The isolated product was dried under vacuum to yield 4.5 g (79%) of, 9, as a colorless solid, mp 104-106° C. 1H NMR (MeOH, ( ): 1.46 (m, 2H), 1.6-1.8 (m, 9H), 2.2 (t, 2H), 2.7 (d, 1H), 2.75-2.9 (m, 3H), 3.2-3.3 (m, 5H), 3.5-3.6 (m, 14H), 4.3 (m, 1H), 4.5 (m, 1H); IR (KBr, cm-1): 3280, 2910, 2850, 1690, 1640, 1110, 940. Analysis calc. for $C_{20}H_{38}N_4O_5S.H_2O$: C, 51.70; H, 8.68; N, 12.06. Found: C, 51.95; H, 7.98; N, 11.65.

Step 4: 1-N-tert-Boc-3,5-Bis(13'-(biotinamidyl)-4',7', 10'-trioxatridecanamidyl)-aminoisophthalate

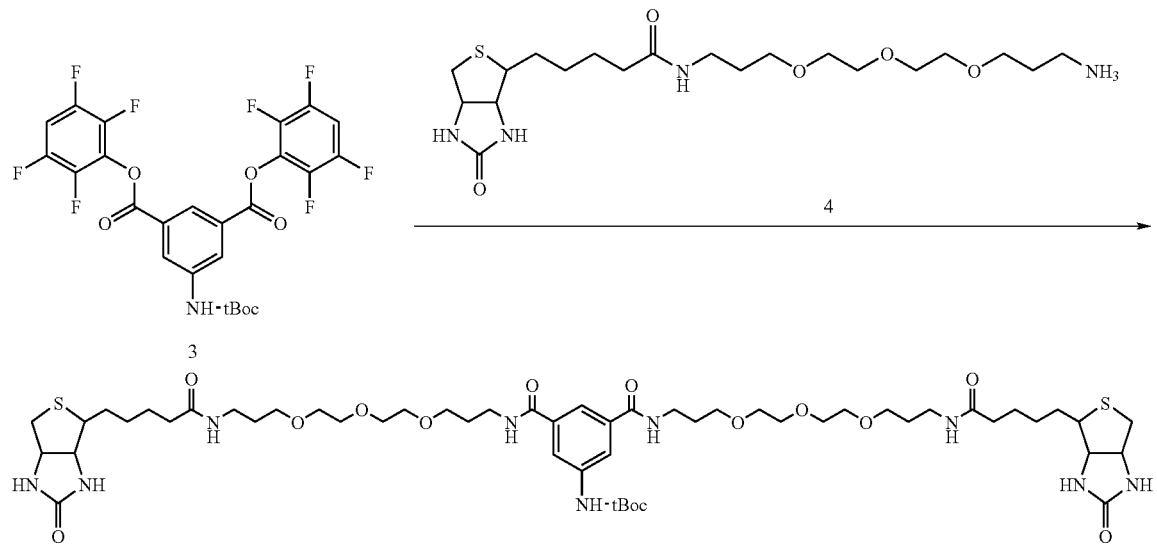

Biotin-trioxadiamine, 4 (100 mg, 0.22 mmol) in anhydrous DMF was added dropwise to a solution of 3 (65 mg, 0.11 mmol) and triethylamine (47 μL, 0.33 mmol) in anhydrous DMF at rt (room temperature). The reaction mixture was stirred at rt for 2 h, and then the solution was evaporated to dryness under vacuum. The residue was purified by silica gel column (40 g) eluting with 20% MeOH/EtOAc to yield 73 mg (58%) of a colorless solid, mp 209-211° C. dec. 1H NMR (CD$_3$OD, 200 MHz): δ 1.43 (t, 3H) 1.54 (s, 9H), 1.69 (m, 6H), 1.88 (m, 3H), 2.19 (m, 4H) 2.69 (d, 4H), 2.92 (m, 2H), 4.30 (m, 2H), 4.48 (m, 2H), 7.83 (m, 1H), 8.00 (m, 2H); mass calcd for C$_{53}$H$_{88}$N$_9$O$_{14}$S$_2$ (M+H))+: 1139. Found: 1139 mass calcd for C$_{53}$H$_{87}$N$_9$O$_{14}$S$_2$Na (M+Na)+: 1161. Found: 1161. HPLC 11.8 min.

Step 5: 1-Isothiocyanato-3,5-Bis(13'-(biotinamidyl)-4',7',10'-trioxatridecandyl)-aminoiso-phthalate A 120 mg quantity of 22 (0.11 mmol) was dissolved in neat TFA (1 mL) and stirred at rt for 10 min. Following this, excess TFA was removed under vacuum. The residue was dissolved in 2 mL of methanol and treated with 0.2 mL of triethylamine. The volatile materials were removed under vacuum, then water (3 mL), chloroform (3 mL) and thiophosgene (42 μL, 0.55 mmol) were added respectively. The mixture was stirred at rt for 1 h. Following this, excess thiophosgene and chloroform were evaporated in fume hood under a stream of argon. The remaining aqueous phase was evaporated to dryness under vacuum to afford 77 mg (68%) of 23 as a light yellow tacky solid. 1H NMR (DMSO-d6, 200 MHz): δ 1.24-1.35 (m, 6H), 1.43-1.67 (m, 14H), 1.77 (t, J=6.6 Hz, 6N), 2.05 (t, J=7.1 Hz, 6H), 2.58 (d, J=12.5 Hz, 2H), 2.82 (dd, J=4.8, 12.5 Hz, 2H); 3.07 (m, 8H), 3.28-3.57 (m, 18H), 4.13 (dd, J=4.6, 7.7 Hz, 2H), 4.31 (dd, J=4.6, 7.7 Hz, 2H), 7.80 (t, J=5.0 Hz, 2H), 7.98 (s, 2H), 8.34 (s, 1H), 8.77 (t, J=5.1 Hz, 2H) mass calcd for C$_{49}$H$_{78}$N$_9$O$_{12}$S$_3$Na (M+Na)+: 1103. Found: 1103. HPLC 11.8 min.

Example 2

Conjugation of a Dibiotin Compound with a Toxin Binding Molecule

A 108 mg (15 equiv.) quantity of the dibiotin isothiocyanate compound, 23, in 4 μL DMSO was added to 150 μL of a 6.7 mg/mL solution of the monoclonal antibody 53-6A2 (1 mg). The mixture was lightly vortexed, then allowed to react at room temperature overnight. The dibiotin conjugated antibody was purified from excess dibiotin reagent by ultracentrifugation filtration at 6000 rpm in a Centricon 30, followed by 4×1 mL washings with 0.9% saline.

Example 3

Conditioning of an Avidin Column with a Dibiotin-Toxin Binding Conjugate

This example provided is that of a dibiotin compound that also contains another biotin moiety. Two of the biotin moieties will bind with avidin or streptavidin leaving the third biotin moiety available for binding with toxic compounds that are also conjugated with, or are fusion proteins containing, avidin or streptavidin. Thus, in this example the dibiotin compound is a biotin trimer, but the same methods may be used to condition a column with dibiotin compounds that contain other high affinity binding ligands.

Conditioning of a Biotin Binding Column to Convert it to an Avidin-Binding Column:

Two mL of Mitra Avidin-Agarose was packed into a column housing and was washed with >10 mL of PBS at a flow rate of 1 mL/min (1.6 cm/min). Five mL of a 1 mg/mL solution of biotin-trimer in PBS was recirculated through the avidin-column at 1 mL/min for 20 minutes. At end of the recirculation, a sample (0.5 mL) was drawn from the recirculated solution and analysed by an ELISA technique developed by Mitra Medical Technology AB. The biotin-avidin-agarose-column was washed with phosphate buffer at 1 mL/min for 20 minutes. By determining the concentration of biotin-trimer in the recirculated fluid, the amount of adsorbed biotin-trimer was estimated to about 1.9 mg i.e. 0.95 mg/mL of gel at the end of recirculation. The standard curve for determining the concentration of biotin-trimer is shown in FIG. 4.

Biotin-trimer was adsorbed to 2 mL of Mitra Avidin-Agarose. The batch of avidin-agarose utilized had a static binding capacity of biotin of about 74 g/mL. If one biotin-trimer is bound per available binding site this would correspond to 514 g biotin-trimer/mL. As about 0.95 mg biotin-trimer was bound per mL avidin-agarose it can be assumed that the adsorbent was saturated with biotin-trimer.

Assessment of Avidin Adsorption on a Conditioned Column:

An avidin-agarose column that was conditioned with a biotin trimer (i.e. FIG. 4, compound #2) was primed with phosphate buffer. Following this, 20 mL avidin-solution with 1 mg avidin/mL in PBS was recirculated through a biotin-avidin-agarose-column at 1.0 mL/min (1.6 cm/min). Three volumes of the avidin solution (3×20 mL) were processed and aliquots were drawn from the reservoir before start of the recirculation, then after 2 main and in 5 min intervals. The aliquots were analyzed for the quantity of avidin in them using an ELISA technique developed by Mitra Medical Technology AB. The concentration of avidin in the recirculation reservoir is shown in FIG. 5. The dotted line represented the theoretically expected if no saturation effect has occurred. The column is saturated after about 40 min (2 vol.) when about 16 mg (80%) of, avidin has been bound. Signs of saturation was seen after about 20 min (1.0 vol.) when the experimental curve begin to deviate from the theoretical curve which occurred when about 10 mg of Avidin had been bound to the column.

After a 40 min recirculation, about 16 mg of avidin was bound, i.e. 8 mg/mL biotin-avidin-agarose. This corresponds to a 1:1 molar ration between the avidin coupled to agarose and the avidin adsorbed to the biotin-trimer. Initial saturation effects were seen after about one recirculated volume. After 2 volumes processed no further avidin was bound.

The experiments showed that the Avidin-Agarose can be saturated with a biotin-trimer, binding to all sites available for monomeric biotin and that recirculated free avidin efficiently binds to a column packed with the biotin-avidin-agarose. About 8 mg avidin was bound per mL of adsorbent, corresponding to a 1:1 molar ratio between bound avidin and avidin immobilized to the agarose particles.

Example 4

Use of a Conditioned Column to Remove Toxins from Blood

To facilitate the removal of specific toxins from the blood circulation by passing the blood through an avidin/streptavidin coated device which has prior to the use been converted to a specific device by passing a solution containing a column conditioning reagent carrying a specific toxin binding moiety. This would allow the avidin/streptavidin coated device to be used as a technology platform for the removal of various toxins. In specific cases it could be desirable to remove more than one toxin in the same treatment procedure which could easily be achieved by passing a mixture of column conditioning reagents carrying different specific toxin binding moiety. A suitable application for such a multifunctional device could be in the blood clearance of anti-HLA antibodies, anti-blood group antibodies or anti-xenoantibodies prior to organ or cell transplantation. By using a suitable mixture of column conditioning reagents carrying different specific toxin binding moiety directed towards specific sub-types of e.g. anti-HLA antibodies, the toxin removal device can be tailor-made for the patients need prior to treatment.

The conditioning can occur in a the hospital by connecting infusion bags containing the appropriate conditioning reagents carrying different specific toxin binding moieties directed towards specific sub-types to the monitoring unit (reprogrammed dialysis machine) used in the extracorporeal treatment, and the conditioning of the avidin/streptavidin device could be achieved manually or automatically by the monitoring unit. The flow rate of the column conditioning reagent solutions entering the device will in such case determine the proportion of the different specific toxin binding moieties in the final conditioned device.

Alternatively, infusion bags containing mixtures of column conditioning reagents carrying different specific toxin binding moieties or the final devices could be pre-manufactured with certain mixture of specific toxin binding moieties.

Example 5

Application of a Conditioned Column to Improve Immunotargeting in a Two Step Procedure To improve immunotargeting in a two-step procedure by in the first step providing means of efficiently clearing the blood circulation from biotinylated targeting molecules by passing the blood through biotin-binding device and in a second step clearing the blood from subsequently administered toxic derivative of avidin/streptavidin by passing the blood through an avidin/streptavidin binding device which has been produced by passing a solution containing the reagent according to the present invention, e.g. biotin dimers or trimers, through the biotin-binding device.

Alternatively, the order of this process can be reversed as follows.

To improve immunotargeting in a two-step procedure by in the first step providing means of efficiently clearing the blood circulation from SA/avidin conjugated targeting molecules by passing blood through an avidin/streptavidin binding device which has been produced by passing a solution containing biotin dimers or trimers through the biotin-binding device, and in a second step clearing the blood from molecules containing the reagent involved in the methods according to the present invention, e.g. biotin and a radionuclide/cytotoxic moiety by passing the blood through a biotin binding device.

Yet another alternative is to improve immunotargeting in a two-step procedure by in the first step provide means of monitoring the tumor up-take of an biotinylated targeting molecule labeled with an agent which can be detected by a gamma-camera, PET-scan, MRI or other in vivo diagnostic techniques and after appropriate time, clear the blood from non-target bound targeting molecule by passing the blood through an biotin-binding device and at appropriate time administer avidin/SA carrying an cell killing radionuclide/cytotoxic agent which is later cleared from the blood circulation by passing the blood through an avidin/streptavidin binding device which has been produced by passing a solution containing the reagent according to the present invention, e.g. biotin dimers or trimers through the biotin-binding device.

Example 6

Application of a Conditioned Column to Improve Immunotargeting in a Three Step Procedure To improve immunotargeting in a three-step procedure by in the first step providing means of efficiently clearing the blood circulation from biotinylated targeting molecules by passing the blood through an biotin-binding device and in a second step clearing the blood from administered avidin/SA, by passing the blood through an avidin/streptavidin binding device which has been produced by passing a solution containing the reagent according to the present invention, e.g. biotin dimers or trimers through the biotin-binding device and in a third step clearing the blood from molecules containing biotin and a radionuclide/cytotoxic moiety by passing the blood through a biotin-binding device.

The invention claimed is:

1. Method for manufacturing a toxic material binding device, said device useful for the extraction of toxic material from mammalian body fluids in connection with diagnosis or treatment of a mammalian condition or disease, said method comprising:

providing an extracorporeal biotin binding device comprising a biotin binding moiety which is capable of binding two biotin moieties on a particulate or membrane matrix, wherein the biotin binding moiety is avidin or strepavidin; and contacting said extracorporeal biotin binding device with a first reagent having the following general formula:

whereby the first reagent is bound to the extracorporeal biotin binding device, and is thereby converted to the toxic material binding device.

2. Method according to claim 1, and further comprising contacting said extracorporeal biotin binding device with a second reagent having the general formula:

wherein X and Y are natural biotin, norbiotin, homobiotin, oxybiotin, iminobiotin, desthiobiotin, diaminobiotin, biotin sulfoxide, or biotin sulfone, wherein a, b, and c are linkers, which are the same or different, a and b are 20-60 Å long, whereby X and Y bind to the same biotin binding moiety on the matrix and wherein d is a trifunctional crosslinking moiety which is a benzene ring with 1,3,5-substitution that contains functional groups that are linked to the linkers, wherein the toxin binding moiety is a molecule that binds with high affinity to anti-blood group antibodies, anti-HLA antibodies, or anti-xenoantibodies.

3. Method according to claim 2, wherein the tri-functional cross-linking moiety 1,3,5-benzene tricarboxylic acid, 3,5-diaminobenzoic acid, or 5-amino-1,3-dicarboxybenzene.

4. Method according to claim 2, wherein one or more of the linkers a, b, and c is/are linear or branched and contain(s) water solubilizing functionalities or side groups containing amines, carboxylates or hydroxyl functionalities, preferably an alpha carboxylate or an N-methyl group in a view to improving the stability towards enzymatic cleavage of the biotinamide bond between X or Y and the spacer.

5. Method for the extracorporeal extraction of toxic material from mammalian body fluids in connection with diagnosis or treatment of a mammalian condition or disease, wherein the toxic material, which has been added to the blood circulation of a mammal and kept therein for a certain time in order to be concentrated to target tissue or cells, directly or through other previously administered molecules, is completely or partially cleared from the blood circulation by passing the mammalian blood or plasma through an extracorporeal device containing the device manufactured according to any one of claims 2, 3, 4 and 1.

6. Method for the simultaneous blood clearance of multiple anti-HLA antibodies, multiple anti-blood group antibodies or multiple anti-xenoantibodies from blood or plasma which comprises passing the blood or plasma through an extracorporeal device according to any one of claims 2, 3, and 4, wherein the first and second reagents have different specific toxin binding moieties.

7. Extracorporeal device for the extraction of toxic material from mammalian body fluids in connection with diagnosis or treatment of a mammalian condition or disease, wherein it comprises a biotin binding molecule bound to a reagent as specified in any one of claims 2, 3, 4 and 1.

8. Method for the extracorporeal extraction of toxic material from mammalian body fluids in connection with diagnosis or treatment of a mammalian condition or disease, wherein the toxic material is completely or partially cleared from the blood circulation by passing the mammalian blood or plasma through an extracorporeal device containing the device manufactured according to any one of claims 2, 3, 4 and 1.

9. The method according to claim 2, wherein the first and second reagents are contacted with the extracorporeal device by connecting infusion bags containing solutions comprising said reagents to the extracorporeal device.

10. The method according to claim 9, wherein the infusion bag is connected to a monitoring unit used for extracorporeal treatment and where the conversion is achieved manually or automatically by the monitoring unit.

11. The method according to claim 10, wherein the monitoring unit is a reprogrammed dialysis machine.

12. The method according to claim 9, wherein the infusion bags containing mixtures of different reagents comprising different specific toxin binding moieties is premanufactured.

* * * * *